Figure 1:
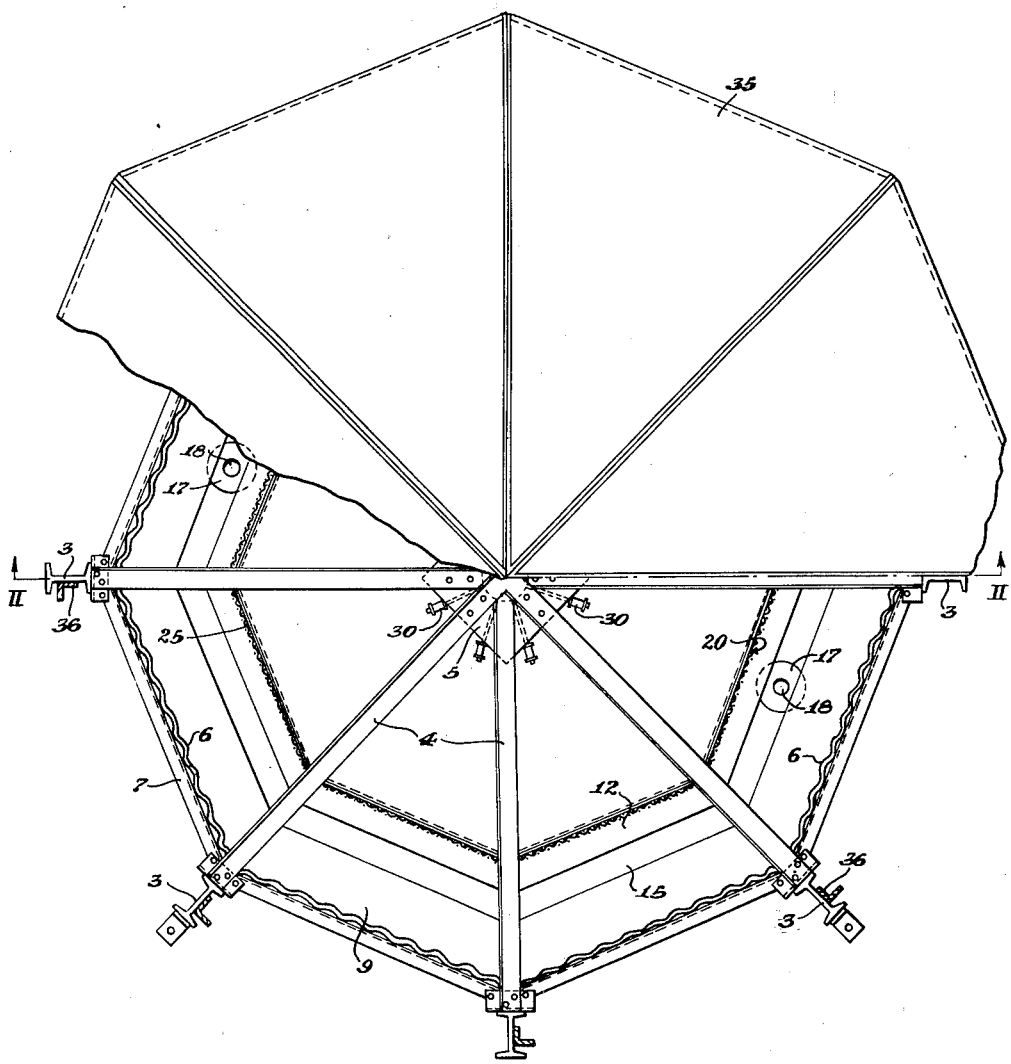

July 31, 1945.  M. I. DORFAN  2,380,826

FLUE GAS SCRUBBER

Filed Oct. 2, 1943  3 Sheets-Sheet 2

INVENTOR.
Morton I. Dorfan
BY Brown, Critchlow & Flick
his ATTORNEYS.

July 31, 1945.　　M. I. DORFAN　　2,380,826
FLUE GAS SCRUBBER
Filed Oct. 2, 1943　　3 Sheets-Sheet 3
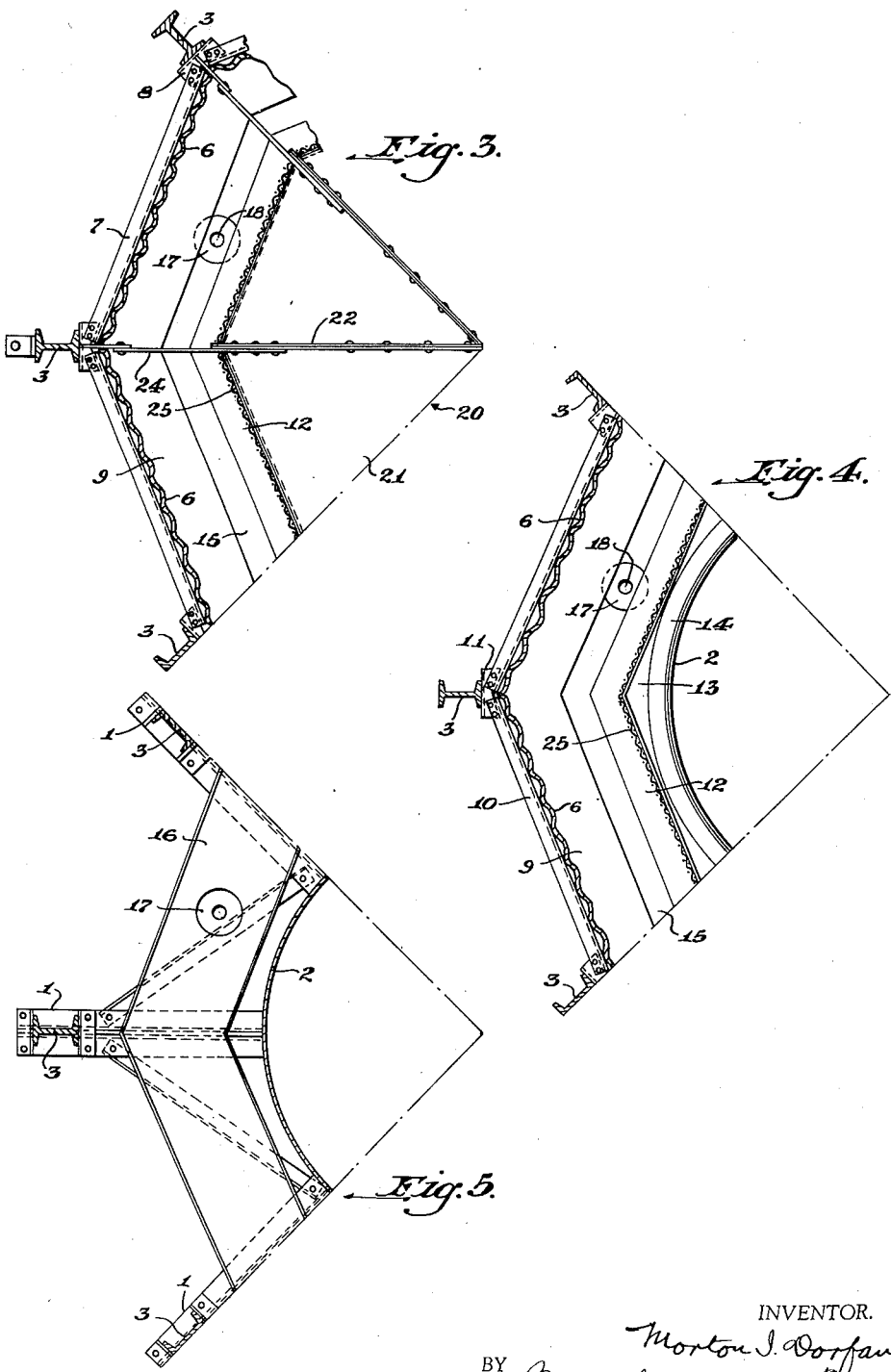
INVENTOR.
Morton I. Dorfan
BY Brown, Critchlow & Pick
ATTYS.

Patented July 31, 1945

2,380,826

UNITED STATES PATENT OFFICE 2,380,826

FLUE GAS SCRUBBER

Morton I. Dorfan, Pittsburgh, Pa.

Application October 2, 1943, Serial No. 504,677

6 Claims. (Cl. 261—126)

This invention relates to combination flue gas scrubbers and spark arrestors mounted on the upper ends of stacks, such as cupola stacks, where they prevent sparks from escaping into the atmosphere and wash the flue gases to remove foreign particles and noxious vapors therefrom. The invention relates more particularly to the type of scrubber in which the flue gas spreads out laterally from the top of the stack and is washed by water falling across the outlet and through the gas from the edge of a gas deflector mounted above the stack.

It is among the objects of this invention to improve upon such scrubbers to the end of causing the water to fall from the edge of the gas deflector as a substantially continuous curtain instead of in streams between which some of the gas could escape without being washed. Other objects are to provide a scrubber in which the flue gas is washed a plurality of times, but which is comparatively simple and inexpensive in construction.

In accordance with this invention an upwardly tapered gas deflector is mounted above a stack, from which flue gases are emerging, so that a lateral outlet for the gas is formed between the edge of the deflector and the top of the stack. A screen may extend around this outlet to prevent the escape of sparks. A vertical casing, preferably provided with vertical corrugations, surrounds the deflector and screen from which it is spaced. Water is delivered to the top of the deflector and to the upper part of the inside of the casing. The water flows over the top of the tapered deflector and falls from its edge across the gas outlet, and the water on the casing runs down its inner surface to form a sheet of water that again washes the gas. In order to provide a continuous curtain of water around the gas outlet, channeling of the water flowing down the deflector is avoided by making the deflector polygonal so that its upper surface is formed from a plurality of flat triangular surfaces sloping downwardly from its apex. The water spreads out evenly on these flat surfaces and flows over the straight sides of the deflector in an unbroken curtain. The water from the deflector and casing drains into a trough below them from which it is carried away. The water preferably is applied to the deflector and casing by a plurality of nozzles above the central position of the deflector, some of the nozzles being directed downwardly toward the deflector and the rest of them spraying streams of water laterally against the surrounding casing.

Figure 2:
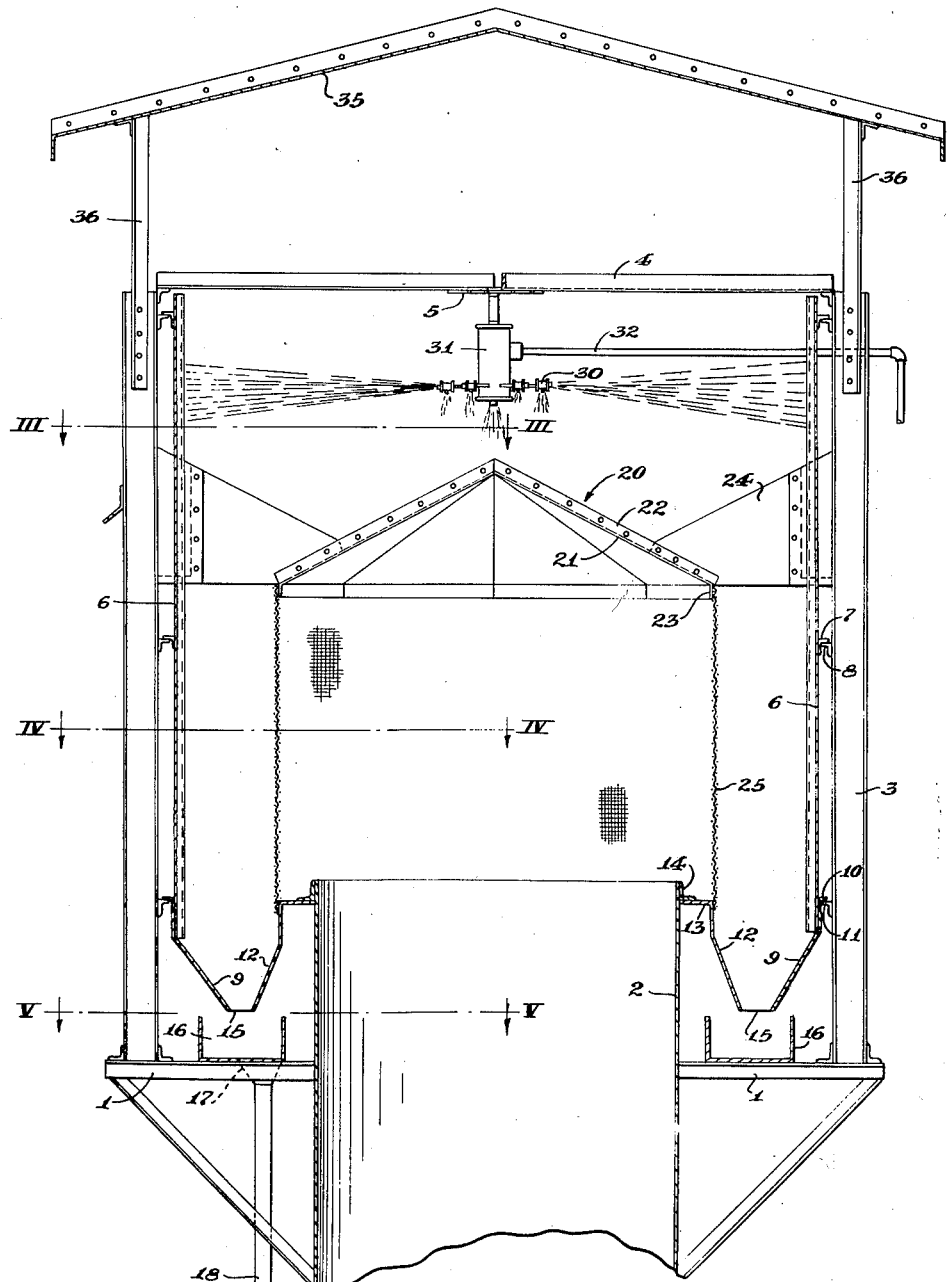

The preferred embodiment of the invention is illustrated in the accompanying drawings in which Fig. 1 is a plan view of my scrubber with the roof partly broken away; Fig. 2 is a vertical section taken on the line II—II of Fig. 1; and Figs. 3, 4, and 5 are enlarged fragmentary horizontal sections taken on the lines III—III, IV—IV, and V—V, respectively, of Fig. 2.

Referring to the drawings, a plurality of metal brackets 1 are secured radially to the outside of a stack 2, such as a cupola, in circumferentially spaced relation near its top. Any convenient number of brackets may be used, eight being shown in the drawings as the preferred number. Mounted on the outer end of each of these brackets is a column 3 that extends up above the top of the stack a considerable distance. The upper ends of these columns are connected by radial beams 4 to a center plate 5 above the center of the stack.

Within the area bounded by the columns there is a vertical casing formed from a plurality of metal sheets 6 that preferably are provided with vertical corrugations to strengthen them and increase their surface area. These sheets are joined edge to edge and are supported by vertically spaced horizontal angle irons 7 the ends of which are mounted on clip angles 8 secured to the inner sides of the columns. The casing thus is polygonal horizontally, the one illustrated having eight sides. The bottom of the casing extends down along the inner surface of a continuous drain plate 9 that converges downwardly toward the stack that it surrounds. The upper edge of this plate is turned outwardly to form a flange 10 that rests on clip angles 11 secured to the columns. Between plate 9 and the stack is another drain plate 12 the upper edge of which is turned inwardly to form a flange 13 that is secured to the bottom of an angle iron 14 encircling the top of the stack. Inner plate 12 diverges downwardly away from the stack but does not touch the outer drain plate, whereby a drain slot 15 is formed between their lower edges. It will be observed that the drain plates, which conform to the shape of the casing, likewise are polygonal. The drain slot is located directly above a polygonal trough 16 mounted on brackets 1 and also extending around the stack. The bottom of this trough is provided with openings 17 to which drain pipes 18 are connected.

Located directly above the top of the stack and near the upper ends of columns 3 is an upwardly tapered baffle member or deflector 20. This deflector is spaced a considerable distance from the top of the stack to provide an annular lateral outlet for the flue gases between the deflector and the top of the stack. It is a feature of this invention that the deflector is polygonal, having the same number of sides as the casing with those sides parallel to the adjacent casing sides. The deflector is formed from a plurality of flat triangular plates 21 the bases of which form its eight straight sides and the apexes of which meet at the apex of the deflector. These flat plates have their sides turned up to form vertical flanges 22 which are joined together to form a strong, unitary structure. The edge of the deflector is turned down to provide a vertical flange 23. The deflector is supported by vertical plates 24 attached to the lower ends of its top flanges 22 and extending through slots in casing sheets 6 to columns 3 to which they are secured. An eight-sided spark arresting screen 25 preferably extends from deflector flange 23 down across the gas outlet to the top of inner drain plate 12.

To wash the gases that pass from the stack out through the spark screen, water is caused to flow from the edge of the deflector down across the screen. This water is caught by the drain plates and directed through drain slot 15 into trough 16. The water is delivered to the top of the deflector from a plurality of nozzles 30 that extend radially from a central header 31 suspended from center plate 5. The header is connected by a pipe 32 to a suitable source of water under pressure (not shown). There is one nozzle above the upper end of each flat plate 21 forming the deflector, and each nozzle has two outlets. One outlet is directed down toward the deflector and the other is directed horizontally to spray water out against the upper portions of the corrugated casing sheets. The water flowing down the flat deflector plates spreads out evenly, instead of channeling, and falls over their straight lower edges and across the flue gas outlet, thereby forming a continuous curtain of water around the upper end of the stack through which the flue gas must pass before it can reach the atmosphere. The water sprayed onto the casing flows in a sheet down its inner surface to drain plate 9. The flue gases that have passed through the curtain of water around the spark screen come in contact with the sheet of water on the casing and are subjected to further washing by it before escaping through the open top of the casing.

The open top of the casing preferably is covered by a roof 35 mounted on vertical angles 36 secured to the upper ends of columns 3. Of course, this roof is spaced from the casing to leave an outlet for the flue gas.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A flue gas scrubber comprising an upwardly tapered polygonal gas deflector adapted to be mounted above a stack whereby to form a lateral flue gas outlet between the edge of the deflector and the top of the stack, said deflector having flat upper surfaces extending up to its apex from its several sides, a vertical casing surrounding said deflector and outlet and spaced therefrom, separate means for delivering water to the upper portion of each of said flat surfaces of the deflector to produce a substantially continuous curtain of water falling from the edge of the deflector across said outlet, and means located above the deflector for delivering water to the upper part of said casing to produce a downwardly flowing sheet of water on its inner surface for engagement by gas that has passed through said water curtain.

2. A flue gas scrubber comprising an upwardly tapered polygonal gas deflector adapted to be mounted above a stack whereby to form a lateral flue gas outlet between the edge of the deflector and the top of the stack, said deflector having flat upper surfaces extending up to its apex from its several sides, a polygonal vertical casing surrounding said deflector and outlet and spaced therefrom, said casing having the same number of sides as the deflector, the adjacent casing and deflector sides being disposed parallel to each other, separate means for delivering water to the upper portion of each of said flat surfaces of the deflector to produce a substantially continuous curtain of water falling from the edge of the deflector across said outlet, and means located above the deflector for delivering water to the upper part of said casing to produce a downwardly flowing sheet of water on its inner surface for engagement by gas that has passed through said water curtain.

3. A flue gas scrubber comprising an upwardly tapered polygonal gas deflector adapted to be mounted above a stack whereby to form a lateral flue gas outlet between the edge of the deflector and the top of the stack, a spark arresting screen extending around said outlet, said deflector having flat upper surfaces extending up to its apex from its several sides, a vertical casing surrounding said deflector and screen and spaced therefrom, separate means for delivering water to the upper portion of each of said flat surfaces of the deflector to produce a substantially continuous curtain of water falling from the edge of the deflector across said outlet, means for delivering water to the upper part of said casing to produce a downwardly flowing sheet of water on its inner surface for engagement by gas that has passed through said water curtain, laterally spaced drain plates converging downwardly from the lower ends of said screen and casing, and a trough below said plates for receiving water falling therefrom.

4. A flue gas scrubber comprising an upwardly tapered polygonal gas deflector adapted to be mounted above a stack whereby to form a lateral flue gas outlet between the edge of the deflector and the top of the stack, said deflector having flat upper surfaces extending up to its apex from its several sides, a vertical casing surrounding said deflector and outlet and spaced therefrom, said casing being provided with vertical corrugations, separate means for delivering water to the upper portion of each of said flat surfaces of the deflector to produce a substantially continuous curtain of water falling from the edge of the deflector across said outlet, and means for delivering water to the upper part of said casing to produce a downwardly flowing sheet of water on its inner surface for engagement by gas that has passed through said water curtain.

5. A flue gas scrubber comprising an upwardly tapered polygonal gas deflector adapted to be mounted above a stack whereby to form a lateral flue gas outlet between the edge of the deflector and the top of the stack, said deflector having flat upper surfaces extending up to its apex from its several sides, a vertical casing surrounding said deflector and outlet and spaced therefrom, downwardly directed jets above the deflector for spraying water on top of the deflector to produce a substantially continuous curtain of water falling from the edge of the deflector across said outlet, one of said jets being directed against the upper portion of each of said flat surfaces, and laterally directed jets above the deflector for spraying water on the upper part of the inner surface of the casing to produce a downwardly flowing sheet of water for engagement by gas that has passed through said water curtain.

6. A flue gas scrubber comprising an upwardly tapered polygonal gas deflector adapted to be mounted above a stack whereby to form a lateral flue gas outlet between the edge of the deflector and the top of the stack, said deflector having flat upper surfaces extending up to its apex from its several sides, a vertical casing surrounding said deflector and outlet and spaced therefrom, a header mounted above the center of said deflector, means for supplying water under pressure to said header, and a plurality of nozzles projecting radially from the header with a separate nozzle disposed above the upper portion of each of said flat surfaces, each nozzle being provided with an outlet in its bottom for spraying water on the underlying flat surface and with an outlet in its outer end for spraying water on the upper part of the inner surface of the casing.

MORTON I. DORFAN.